United States Patent
Abanades Garcia et al.

(10) Patent No.: US 8,757,072 B2
(45) Date of Patent: Jun. 24, 2014

(54) METHOD AND DEVICE FOR BIOMASS COMBUSTION WITHOUT CARBON DIOXIDE EMISSION

(75) Inventors: Juan Carlos Abanades Garcia, Oviedo (ES); Mónica Alonso Carreño, Oviedo (ES); Nuria Rodriguez Gómez, Oviedo (ES)

(73) Assignee: Gas Natural SDG, S.A., Barcelona (ES)

( * ) Notice: Subject to any disclaimer, the term of this patent is extended or adjusted under 35 U.S.C. 154(b) by 251 days.

(21) Appl. No.: 13/130,374

(22) PCT Filed: Nov. 18, 2009

(86) PCT No.: PCT/ES2009/070513
§ 371 (c)(1),
(2), (4) Date: Jun. 27, 2011

(87) PCT Pub. No.: WO2010/058054
PCT Pub. Date: May 27, 2010

(65) Prior Publication Data
US 2011/0250550 A1    Oct. 13, 2011

(30) Foreign Application Priority Data
Nov. 21, 2008 (ES) .................................. 200803325

(51) Int. Cl.
*F23J 15/00* (2006.01)
(52) U.S. Cl.
USPC .......................................................... 110/344
(58) Field of Classification Search
USPC ......... 110/203, 216, 244, 245, 342, 344, 345, 110/346, 233, 234; 431/3, 7, 115, 116; 422/139, 141, 144; 60/722, 781, 783
See application file for complete search history.

(56) References Cited

U.S. PATENT DOCUMENTS

| 5,520,894 A | 5/1996 | Heesink et al. |
| 5,526,775 A | 6/1996 | Hyppanen |
| 6,264,738 B1 * | 7/2001 | Lorke et al. .................... 106/739 |

(Continued)

FOREIGN PATENT DOCUMENTS

| DE | 10 2007 015 082 | 10/2008 |
| ES | 2 128 765 | 5/1999 |

(Continued)

OTHER PUBLICATIONS

Supplementary European Search Report dated Jun. 11, 2012, from corresponding European Application No. 09 82 7213.

(Continued)

*Primary Examiner* — Kenneth Rinehart
*Assistant Examiner* — Tavia Sullens
(74) *Attorney, Agent, or Firm* — Katten Muchin Rosenman LLP

(57) ABSTRACT

The invention relates to a device and a method for biomass combustion and simultaneous $CO_2$ capture for capturing the $CO_2$ generated in said combustion to generate a substantially pure $CO_2$ stream (9) which can be subsequently stored. The device comprises a combustor-carbonator reactor (a) which is fed with biomass and air; at least one solids recycling cyclone (b, c) which separates solids (5) returning to the combustor-carbonator and from which there exits a solids and gases stream (4). The device comprises a calciner B which regenerates CaO, a fluidized bed (d) and means for feeding fresh $CaCO_3$ (12) and for purging solids (11).

2 Claims, 2 Drawing Sheets

(56) References Cited

U.S. PATENT DOCUMENTS

| | | | |
|---|---|---|---|
| 6,790,430 B1 * | 9/2004 | Lackner et al. | 423/648.1 |
| 7,614,352 B2 | 11/2009 | Anthony et al. | |
| 2005/0060985 A1 | 3/2005 | Abanades Garcia et al. | |
| 2006/0130719 A1 * | 6/2006 | Morin et al. | 110/244 |
| 2007/0056487 A1 | 3/2007 | Anthony et al. | |
| 2009/0169462 A1 | 7/2009 | Abanades Garcia | |

FOREIGN PATENT DOCUMENTS

| | | |
|---|---|---|
| ES | 2 302 610 | 7/2008 |
| WO | 96/11743 | 4/1996 |
| WO | 03/080223 | 10/2003 |
| WO | 2004/097297 | 11/2004 |

OTHER PUBLICATIONS

Anja Schuster. "Calcium Looping Activities at IVD" 4th International Workshop on In-Situ C02 Removal, May 7-8, 2008, pp. 1-40, retrieve from http://www3.imperial.ac.uk/pls/portallive/docs/1/45475696.pdf.

International Search Report dated Mar. 22, 2010, from corresponding International Application No. PCT/ES2009/070513.

International Preliminary Report on Patentability dated Feb. 23, 2011, from corresponding International Application No. PCT/ES2009/070513.

Robin W. Hughes, et al. "Design, process simulation and construction of an atmospheric dual fluidized bed combustion system for in situ CO2 capture using high-temperature sorbents" Fuel Processing Technology 86 (2005) 1523-1531.

M. Alonso, et al. "Modelling of a fluidized bed carbonator reactor to capture CO2 from a combustion flue gas" Chemical Engineering Science 64 (2009) 883-891.

Carlos Salvador, et al. "Capture of CO2 with CaO in a Pilot Fluidized Bed Carbonator Experimental Results and Reactor Model" Greenhouse Gas Control Technologies 7, Elsevier Science Ltd, Oxford, 2005, pp. 1107-1113.

J. Carlos Abanades, et al. "Fluidized Bed Combustion Systems Integrating CO2 Capture with CaO" Environmental Science & Technology, Apr. 15, 2005, vol. 39, No. 8, pp. 2861-2866.

N. Rodriguez, et al. "Heat Requirements in a calciner of CaCO3 integrated in a CO2 capture system using CaO" Chemical Engineering Journal 138 (2008) 148-154.

T. Shimizu, et al. "A Twin Fluid-Bed Reactor for Removal of CO2 from Combustion Processes" Institution of Chemical Engineers, Trans IChemE, vol. 77, Part A, Jan. 1999.

J. Carlos Abanades, et al. "In-Situ Capture of CO2 in a Fluidized Bed Combustor" Proceedings of 17th FBC: 17th International (ASME) conference on Fluidized Bed Combustion, May 18-21, 2003.

* cited by examiner

METHOD AND DEVICE FOR BIOMASS COMBUSTION WITHOUT CARBON DIOXIDE EMISSION

FIELD OF THE INVENTION

The present invention is comprised within the field of obtaining energy from biomass combustion, with simultaneous $CO_2$ capture for the subsequent storage thereof, and without releasing significant amounts of carbon dioxide. The present invention specifically relates to a method and a device for biomass combustion and simultaneous $CO_2$ capture, by means of CaO as a $CO_2$ absorbent, generating calcium carbonate. The CaO is subsequently regenerated in a calciner, which can be coupled to the device of the invention.

BACKGROUND OF THE INVENTION

Currently, the generation of electricity from fossil fuels is fundamentally carried out by means of combustion processes which generate considerable amounts of $CO_2$, the main substance responsible for the climate change. Therefore, different methods for $CO_2$ capture for capturing the $CO_2$ released in these processes have been proposed in the state of the art, among which those based on the carbonation-calcination reaction can be emphasized:

$$CaO + CO_2 = CaCO_3$$

U.S. Pat. No. 5,520,894 describes a method for the absorption of $CO_2$ with regenerable solids including, among others, MgO and/or CaO. The regeneration of the carbonate formed is carried out by means of the heat obtained from the combustion gases. This solution is viable for the case of capturing $CO_2$ with MgO, a carbonate being formed since the $MgCO_3$ decomposition temperatures are moderate. However, for the case of CaO as a $CO_2$ sorbent, the proposed system for regeneration by means of $CaCO_3$ calcination is not viable in practice, since the minimum demand of heat in the calciner is very high for $CO_2$ capture efficiencies greater than 70%. [Rodriguez et al., Heat requirements of a $CaCO_3$ calciner when integrated in a $CO_2$ capture system. Chemical Engineering Journal, 138, 1-3, 148-155, 2008]. In other words, at the usual combustion temperatures the minimum temperature necessary for exchanging heat with the $CaCO_3$ calciner is not available in the combustion gases, which calciner, due to the thermodynamic equilibrium, must necessarily be operated at temperatures greater than 900° C. to obtain pure $CO_2$ from the regenerator.

Shimizu et al. (Shimizu et al. A twin fluid-bed reactor for removal of $CO_2$ from combustion processes *Trans IChemE*, 77, A, 1999) published a method for using CaO as an absorbent of the $CO_2$ coming from the combustion gases, with regeneration by means of continuous $CaCO_3$ calcination, to obtain a concentrated $CO_2$ stream. The proposed system uses two interconnected fluidized beds as a carbonator and calciner. The calciner uses oxy-coal combustion to supply the necessary heat to the endothermic step of $CaCO_3$ calcination to give CaO and $CO_2$. The drawback of this $CO_2$ capture system is that it requires being applied to a high-efficiency thermal power station (generating the combustion gas stream which is fed to the carbonator) to maximally reduce the energy penalty of the expensive air separation plant for producing the highly pure $O_2$ required in the calciner.

WO 03/080223 describes a combustion method at temperatures preferably greater than 1000° C., with integrated $CO_2$ separation by carbonation based on using CaO as a carrier of part of the heat generated in a combustion chamber, which is used in the calciner to maintain the endothermic calcination reaction, and regenerate the CaO, without needing to use an air separation plant as proposed by Shimizu et al. To transfer the heat necessary for reaching calcination temperatures greater than 900° C., using circulating fluidized beds separated by metal walls or preferably interconnected by means of a flow of inert solids in the combustion reaction, which transfer heat from the combustion chamber to the calciner, is proposed. The first proposal has been discarded due to the lack of suitable materials.

WO 2004/097297 describes a combustion method with $CO_2$ capture which includes a pressurized bubbling fluidized bed reactor. Three simultaneous reactions are carried out in said reactor: combustion of the carbon material fed to the reactor, "in situ" $CO_2$ capture for capturing the $CO_2$ generated during the combustion and "in situ" $SO_2$ capture for capturing the $SO_2$ generated during the combustion. The last two reactions are possible as a result of the fact that the reactor is continuously fed with a CaO stream, obtained by the combustion of coal under oxy-combustion conditions. Therefore, this method has the drawback of requiring an air separation plant for producing $O_2$. The fuel of the invention is preferably petroleum coke or any other solid fuel with low ash content, to prevent problems with the high regeneration temperatures (>1,000° C.) in the pressurized fluidized bed. This patent describes high-pressure combustion systems due to the fact that they are the only ones in which it is possible to combine high combustion rates of solid fuels with low reactivity, such as petroleum coke, and high sulfation retention and carbonation efficiencies.

Abanades et al. (Abanades, J. C.; et al. Fluidized Bed Combustion Systems Integrating $CO_2$ Capture with CaO. Environ. Sci. Tech. 2005, 39(8), 2861; and Abanades, J. C., et al. In-situ capture of $CO_2$ in a fluidized bed combustor. 17th Int. Conf. on Fluidized Bed Combustion, FL-USA, ASME. May 2003. paper 10) describe a method similar to that of application WO 2004/097297, but at atmospheric pressure and only valid for fuels with a high reactivity and very low sulfur content, such as biomass. The method consists of biomass combustion and simultaneous "in situ" $CO_2$ capture for capturing the $CO_2$ formed by carbonation working at about 700° C. However, it has not been possible to demonstrate the viability of the method (C. Salvador, et al. Capture of $CO_2$ with CaO in a pilot fluidized bed carbonator. Experimental results and reactor model. 7th Congress on Greenhouse Gas Control Technologies-GHGT-7; Vancouver, Canada; September 2004) mainly because it is carried out in a bubbling fluidized bed, with a large segregation in the bed of the combustion reaction which prevents the necessary contact between the $CO_2$ and the CaO absorbent particles.

Therefore, and in view of the foregoing, there is still a need in the state of the art for providing an alternative method and device for "in situ" combustion and carbonation which at least partly overcome the mentioned problems of the state of the art and are more efficient from an energy and economic point of view, and are therefore interesting for their scaling to industrial level.

DESCRIPTION OF THE INVENTION

Figure 1:
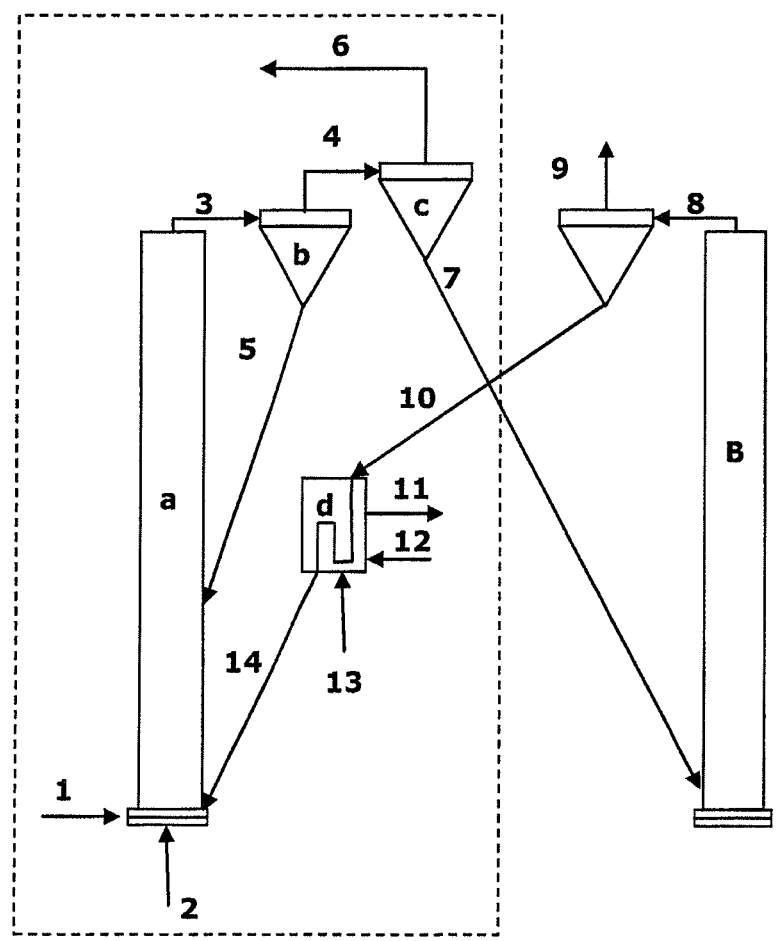
FIG. 1 shows a diagram of the combustion-carbonation device of the invention and a flowchart of the method of the invention.

In a first aspect, the invention relates to a new device, hereinafter device of the invention, for biomass combustion and simultaneous $CO_2$ capture for capturing the $CO_2$ generated in said combustion, comprising:

(i) a circulating fluidized bed combustor-carbonator (a) which is fed with biomass (1) and air (2), emits a solids and gases stream (3), operates at a temperature of between 550 and 700° C., and comprises an amount of CaO of at least 500 kg $CaO/m^2$.

In the context of the invention, the expression "an amount of CaO of at least 500 kg $CaO/m^2$" relates to an amount of CaO of at least 500 kg for every $m^2$ of cross-section of the combustion-carbonation reactor.

In a preferred embodiment of the device of the invention the combustor-carbonator (a) operates at a temperature comprised between 600 and 650° C. The amount of at least 500 kg $CaO/m^2$ of CaO in the bed of the combustor-carbonator is important for the biomass combustion and CaO carbonation reactions to take place simultaneously.

In another preferred embodiment the amount of CaO in the combustor-carbonator is comprised between 1000-2000 kg $CaO/m^2$.

The amount of CaO must remain stable in the bed. The stability must be achieved by means of the supply of the streams (5) and (14) to the combustor-carbonator. The minimum supply of solids to the combustor-carbonator is formed by the stream (14). This supply of CaO from the calciner B is the one necessary for obtaining high efficiencies (for example, greater than 70%) in $CO_2$ capture by means of the carbonation reaction. Said supply has been experimentally determined by the inventors and is comprised between 5 and 20 times the molar flow of carbon fed with the biomass to the combustor-carbonator. Furthermore, the CaO of the combustor-carbonator is continuously renewed in the device of the invention by means of the continuous feed of $CaCO_3$ in the form of fresh limestone (12) and the continuous purge of solids (11).

In a particular embodiment, the device of the invention comprises, in addition to the combustor-carbonator (a), the following elements (FIG. 1):

(ii) a primary solids recycling cyclone (b), at which the stream (3) arrives, which separates solids (5) entering the combustor-carbonator, and from which there exits a solids and gases stream (4);

(iii) a secondary solids recycling cyclone (c), at which the stream (4) arrives, which separates solids (7) entering the calciner (B) and from which there exits a gas stream (6);

(iv) a calciner (B) from which there exits a stream (8) which is separated into $CO_2$ and solids (10);

(v) a fluidized bed (d) which is fluidized with steam or $CO_2$ (13), at which the solids (10) arrive and from which there exit solids (14) entering the combustor-carbonator; and (vi) means for purging solids (11) from the fluidized bed (d), and means for feeding fresh limestone (12) to the fluidized bed (d).

By means of the primary and secondary cyclones a double recycling of solids (5) and (14) to the combustor-carbonator (a) is assured, which assures inventories of solids in the bed of an amount of CaO of at least 500 $kg/m^2$ in the combustion-carbonation reactor. The primary cyclone is designed to operate with solids separation efficiencies comprised between 70 and 90%, allowing the exit of a stream (4) comprising solids to the secondary cyclone (c), which receives the gases and solids exiting the primary cyclone and separates on one hand a partially carbonated solids stream (7) which is intended for the calciner B and, on the other hand, a gas stream with a reduced $CO_2$ content (6) with $CO_2$ partial pressures of between 0.005-0.035 atmospheres.

The partially carbonated solid (7) is continuously calcined in the calciner B, regenerating the CaO and generating a pure or easy to purify $CO_2$ stream (9), which can be geologically stored permanently. Calcination is an endothermic process and the energy necessary for the reaction can be obtained by, for example, burning a part of a fuel, such as biomass, coal etc., in the presence of oxygen optionally obtained from an air separation plant as is known from the state of the art.

The CaO is in particle form. The choice of the grain size of the CaO, the design of the interconnections between elements of the device of the invention from the point of view of the transfer of solids between them, as well as the separation of the solids from the gases entraining them is performed by means of elements and methods of the state of the art relating to gas/solid fluidized systems.

The bubbling fluidized bed (d) which is fluidized with steam or $CO_2$ (13) allows, on one hand, recovering heat from the solids (10) of the second recycling and, on the other hand, continuously feeding fresh limestone and continuously purging depleted solids whereby the amount of CaO in the combustor-carbonator remains constant, assuring the efficient operation of the device of the invention. These depleted solids comprise CaO, ashes and inert substances in the combustor-carbonator and in the calciner. The bubbling fluidized bed (d) acts as a solids valve which allows recovering heat from the solids stream entering the combustor-carbonator from the calciner.

In another particular embodiment, the device of the invention comprises, in addition to the combustor-carbonator (a):

(ii) a solids recycling cyclone (b), at which the stream (3) arrives, which separates the solids from the gases; and (iii) a solids valve which separates the solids stream exiting the cyclone into two streams, one of which is recirculated to the combustor-carbonator and the other of which is taken to the calciner.

It is thus also possible to maintain an inventory of solids in the combustor-carbonator above 500 kg $CaO/m^2$, while at the same time an intense circulation of solids is maintained with the calciner.

In another aspect, the present invention relates to a method for biomass combustion and simultaneous $CO_2$ capture for capturing the $CO_2$ generated in said combustion, comprising a step of:

a) biomass combustion and simultaneous CaO carbonation to generate $CaCO_3$ in a circulating fluidized bed combustor-carbonator having an amount of CaO of at least 500 kg CaO/$m^2$ at a temperature comprised between 550 and 700° C.

This method, hereinafter method of the invention, can be carried out in a device like that of the present invention.

In a preferred embodiment of the method of the invention, the combustion and carbonation take place in a circulating fluidized bed combustor-carbonator at a temperature comprised between 600 and 650° C.

Although the combustion and carbonation reactions take place at temperatures between 550-700° C., the interval of between 600-650° C. is preferred since it has been proved that a more effective use of the heat generated in the combustion and carbonation reactions can thus be made, maintaining high reaction rates and combustion efficiencies. The inventors have observed in tests performed in a prototype of interconnected circulating fluidized beds that the method of the invention carried out at these temperatures maximizes $CO_2$ capture in the combustor-carbonator, reaching carbonation efficiencies greater than 80% and combustion efficiencies greater than 95%.

Figure 2:
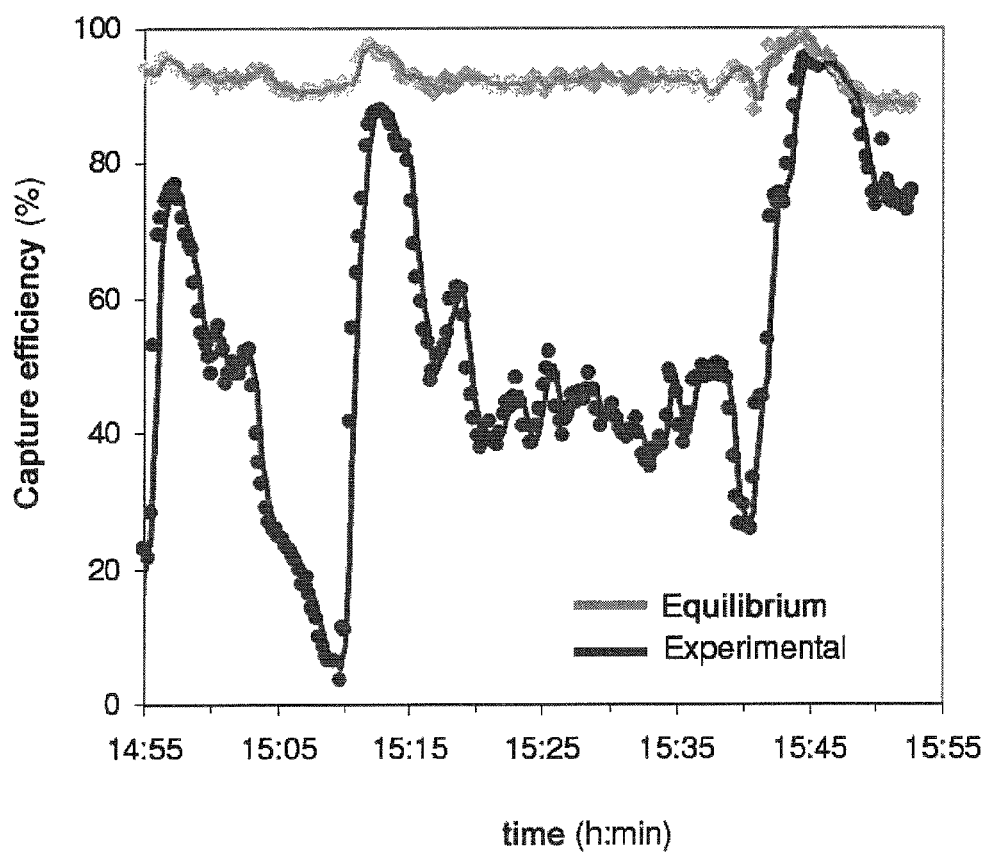
FIG. 2 shows a graph which depicts the experimental efficiencies of the $CO_2$ capture obtained in the combustion-carbonation device of the invention at different times together with the maximum efficiencies allowed by the equilibrium under the conditions present in the device at those same times.

FIG. 2 shows the results obtained in a particular embodiment of the method and of the device of the invention.

In a particular embodiment, the combustion and carbonation take place in a fluidized bed combustor-carbonator having an amount of CaO comprised between 1000 and 2000 kg $CaO/m^2$.

In another particular embodiment of the method of the invention, the latter further comprises the following steps:
- separating solids from the outlet stream (3) of the combustor-carbonator (a) in a primary cyclone (b), recycling them (5) to the combustor-carbonator and separating them from an outlet stream (4);
- separating solids from the outlet stream (4) of the primary cyclone (b) in a secondary cyclone (c), leading them to a calciner (B) and separating them from a gas stream (6);
- continuously calcining the $CaCO_3$ to separate $CO_2$ (9) from a solids stream (10);
- taking the solids stream (10) to a fluidized bed (d),
- continuously feeding fresh limestone (12) to the fluidized bed (d),
- continuously purging solids (11) from the fluidized bed (d) and
- feeding a stream (14) from the fluidized bed (d) to the combustor-carbonator (a).

In another particular embodiment of the method of the invention, the latter further comprises:
- (ii) separating the solids from the gases in a solids recycling cyclone (b) at which the stream (3) arrives; and
- (iii) separating by means of a solids valve the solids stream exiting the cyclone (b) into two streams, one of which is recirculated to the combustor-carbonator and the other of which is taken to the calciner.

The method of the invention further comprises recovering heat released in the combustion and carbonation reactions from one or more of the streams resulting from the method. In a particular embodiment, the heat is recovered from one or more of the following streams:
- from the solids stream (10) in the fluidized bed (d) which is fluidized with steam or $CO_2$,
- from the gases stream (6) of the secondary cyclone (c),
- from the purged solids stream (11);
- from the stream (5) for returning solids to the combustor-carbonator.

The recovered heat is used in a steam cycle to generate electricity or steam in a new steam cycle or to be integrated as a new heat source in the steam cycle of a larger existing power station. In the latter case, the hot combustion gases with low $CO_2$ content (6) can be fed to the combustion gases of a coal-fired thermal power station to recover the heat thereof and dilute the fossil carbon content in the coal combustion gases stream.

One of the additional advantages of the method of the invention lies in that it is a process which can be integrated as a heat source in a thermal power station, generating electricity with negative $CO_2$ emissions, since the carbon captured from the atmosphere by the biomass during its growth is captured by means of this method and can be stored in a pure and permanent manner in the subsoil.

An illustrative example is presented below which is set forth for a better understanding of the invention and in no case must it be considered as a limitation of the scope thereof.

EXAMPLE

Example 1

To put the method and the device of the invention into practice, a prototype was used which consists of two reactors with a diameter of 100 mm and a height of 3.2 m interconnected by means of cyclones, solids discharge pipes (standpipes) and fluidized solids valve (loop seals). One of the reactors was operated as a combustor-carbonator and the other reactor as a continuous calciner for continuously supplying calcined CaO to the combustor-carbonator.

FIG. 2 is a graph depicting the results obtained, the capture efficiency (%) in the combustion-carbonation reactor of this experimental prototype of interconnected fluidized beds, against time.

Multiple experiments have been performed with two types of biomass (sawdust and ground olive pits), different biomass and air feed rates, and different solids circulation flow rates (approximately between 0.5-5 $kg/m^2s$). The line (Equilibrium) of FIG. 2 indicates the maximum $CO_2$ capture efficiency allowed by the $CaO/CaCO_3$ equilibrium according to the temperature and composition of individual combustion gases (not shown for the sake of simplicity). The results shown in FIG. 2 (Experimental) include three extreme situations: states of the system with very low $CO_2$ capture efficiency due to lack of active material in the bed, stable state of the system with an intermediate capture efficiency and unstable states with very high $CO_2$ capture efficiency.

FIG. 2 shows how around 15:10, the capture efficiency decreases abruptly due to the fact that the solids feed of the combustor-carbonator is stopped in order to attempt measuring the circulation rate of such solids. This translates into a rapid disappearance of the solids in the combustor-carbonator, which operates in that situation as a biomass combustor without capturing $CO_2$. When the air flow rate to the solids valve (loop seal) is restored, the capture efficiency increases to a value of 88%. This efficiency corresponds to a bed with sufficient active CaO particles in its inventory, in this case due to the rapid entry of CaO from the calciner when aeration of the solids valve starts. These solids are carbonated and therefore the bed progressively loses the capacity to absorb $CO_2$. Only the continuous feeding of solids from the calciner sustains approximately stable capture efficiencies between 40-50%. Finally, at around 15:40, 3.2 kg of partially calcined solids are loaded and the capture efficiency increases to values of about 96.6% at 15:45, to decrease to values of about 76.6% at 15:50, again due to the loss of active material in the combustor-carbonator.

The invention claimed is:

1. A method for biomass combustion and simultaneous capture of $CO_2$ generated in the combustion, the method comprising the steps of:
   (a) feeding biomass and air into a circulating fluidized bed combustor-carbonator;
   (b) effecting in the combustor-carbonator a biomass combustion and simultaneous CaO carbonation to generate $CaCO_3$ at a temperature between 550 and 700° C.;
   (c) separating a first stream of solids and gases from the combustor-carbonator in a first cyclone into a first solids stream and a second stream of solids and gases and recycling the first solids stream to the combustor-carbonator;
   (d) separating the second stream of solids and gases in a second cyclone into a second solids stream and a gas stream and leading the second solids stream to a calciner;

(e) continuously calcining CaCO₃ contained in the second solids stream and separating a resulting $CO_2$-containing stream from the calciner into a $CO_2$ stream and a third solids stream;
(f) sending the third solids stream to a fluidized bed, the fluidized bed being fluidized with steam or $CO_2$;
(g) continuously feeding fresh limestone to the fluidized bed;
(h) continuously purging a fifth solids stream from the fluidized bed; and
(i) removing a fourth solids stream from the fluidized bed and feeding the fourth solids stream to the combustor-carbonator, the fourth solids stream comprising between 5 and 20 times a molar flow of carbon fed with the biomass, and the combustor-carbonator containing an amount of CaO, in particle form, of at least 500 kg for every square meter cross-section of the combustor-carbonator, the CaO amount remaining stable in the fluidized bed.

2. The method according to claim 1, further comprising a step of
recovering heat from
the third solids stream that is received in the fluidized bed,
the gas stream of the secondary cyclone, or
the first solids stream recycled to the combustor-carbonator.

* * * * *